United States Patent
Tsuida

(10) Patent No.: US 8,816,937 B2
(45) Date of Patent: Aug. 26, 2014

(54) MULTIPROJECTION DISPLAY SYSTEM AND SCREEN FORMING METHOD

(75) Inventor: Shunji Tsuida, Tokyo (JP)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 13/254,321

(22) PCT Filed: Mar. 9, 2010

(86) PCT No.: PCT/JP2010/053834
§ 371 (c)(1),
(2), (4) Date: Sep. 1, 2011

(87) PCT Pub. No.: WO2010/116837
PCT Pub. Date: Oct. 14, 2010

(65) Prior Publication Data
US 2012/0007845 A1    Jan. 12, 2012

(30) Foreign Application Priority Data
Mar. 30, 2009   (JP) .................................. 2009-082216

(51) Int. Cl.
G09G 5/00   (2006.01)

(52) U.S. Cl.
USPC .......................................... 345/1.1; 348/744

(58) Field of Classification Search
USPC ............................ 345/1.1–1.3; 348/744–789
See application file for complete search history.

(56) References Cited

U.S. PATENT DOCUMENTS

2011/0309999 A1 * 12/2011 Chang et al. ................... 345/1.1

FOREIGN PATENT DOCUMENTS

| | | | |
|---|---|---|---|
| CN | 1678049 A | 10/2005 |
| JP | 2002185987 A | 6/2002 |
| JP | 2002277958 A | 9/2002 |
| JP | 2003315914 A | 11/2003 |
| JP | 2005318510 A | 11/2005 |
| JP | 2006-251604 A | 9/2006 |
| JP | 2007166466 A | 6/2007 |

OTHER PUBLICATIONS

International Search Report for PCT/JP2010/053834 mailed May 25, 2010.
Chinese Office Action for CN Application No. 201080014864.9 issued on Jul. 18, 2013 with English Translation.

* cited by examiner

Primary Examiner — Kevin M Nguyen
Assistant Examiner — Cory Almeida
(74) Attorney, Agent, or Firm — Sughrue Mion, PLLC

(57) ABSTRACT

Provided is a multiprojection display system that includes a plurality of cameras configured to capture images of predetermined vertex regions including vertexes of projected images projected from two-dimensional scanning projectors onto a screen, an image-capturing timing control unit configured to control the cameras to capture images of the screen for a predetermine period including a display. start row of one frame of the projected image or a predetermined period including a display end row, and a vertex position detection unit configured to detect vertexes of the respective projected images from data relating to the plurality of images captured by the cameras, and to output data relating to image edges indicating positions of the vertexes. A projector control unit adjusts, when the vertex of the projected image shifts from a present reference position, a scanning range of the two-dimensional scanning projector so that the vertex can be matched with the reference position.

14 Claims, 9 Drawing Sheets

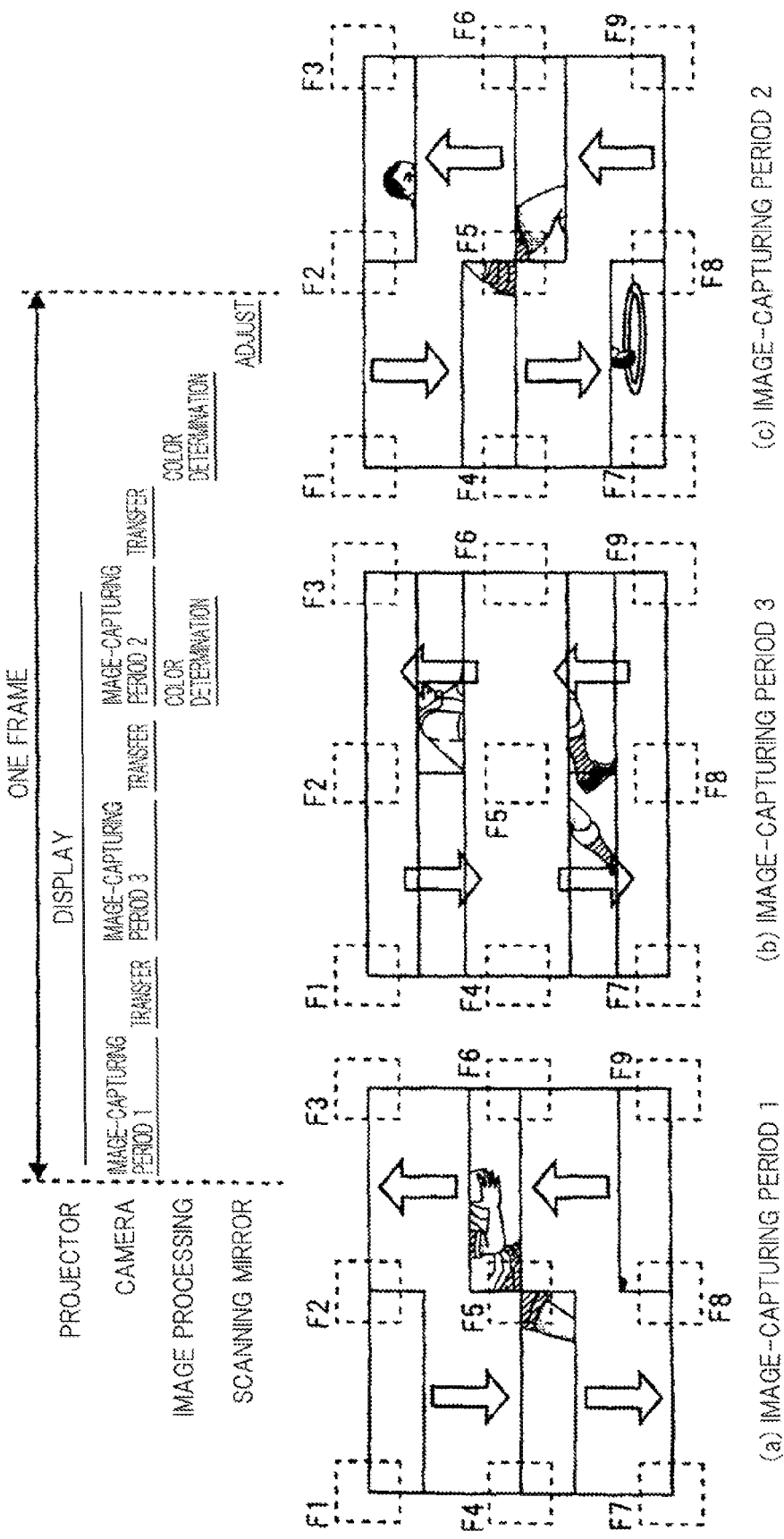

MULTIPROJECTION DISPLAY SYSTEM AND SCREEN FORMING METHOD

TECHNICAL FIELD

The present invention relates to a multiprojection display system that projects images onto a screen from a plurality of projectors to form one screen, and a screen forming method thereof.

BACKGROUND ART

As a large projection display, there is known a multiprojection display system that projects images onto a screen from a plurality of projectors, and connects the projected images to form one screen.

In such a multiprojection display system, positional accuracy of the images projected from the plurality of projectors on the screen greatly affects quality of the entire projected images.

For example, when the projected images shift in position, a discontinuous joint may be formed between the images projected onto the screen or edges of the adjacent images may overlap each other, thus causing great deterioration of display quality.

To deal with the problem, for example, Patent Literature 1 discusses a method of detecting a position of a projected image of each projector by generating a test image having a region to overlap with an adjacent image, inhibiting simultaneous projection of test images from adjacent projectors to project a plurality of images not interfering with each other, and capturing and analyzing the plurality of projected test images by a measurement camera.

Patent Literature 2 discusses a method that generates, while two projectors project test images in an appropriate positional relationship, test images where predetermined feature patterns appear in a superimposed region of the test images, calculates an evaluation value associated with the feature patterns based on data relating to projected images acquired by capturing the test images on a screen by a camera, and adjusts positions of the projected images of the projectors based on the evaluation value.

However, the multiprojection display system of the background art adjusts the position of the image projected onto the screen from each projector by using the test image. This disables adjustment of the position of the image projected from each projector in real time.

For example, when a width or a position of the image projected from each projector changes due to temperature, the projected image must be frequently adjusted by using the test image. As a result, convenience in using an image display apparatus is reduced.

RELATED ART LITERATURES

Patent Literatures

Patent Literature 1: Japanese Patent Laid-Open No 2003-315914
Patent Literature 2: Japanese Patent Laid-Open No 2007-166136

SUMMARY

It is therefore an object of the present invention is to provide a multiprojection display system that needs no test image for adjusting an image position and that can adjust a position of an image projected from each scanning projector, and a screen forming method thereof.

Solution To Problem

To achieve the object of an exemplary aspect of the present invention, a multiprojection display system in which a plurality of two-dimensional scanning projectors project square images onto a screen, and the plurality of projected images are connected on the screen to form one screen, includes:

a plurality of cameras that are installed in positions to capture images of predetermined vertex regions including vertexes of the projected images, and that capture the images of the vertex regions;

an image-capturing timing control unit that controls the plurality of cameras to capture images on the screen during a predetermined period including a display start row of one frame of the projected image or a predetermined period including a display end row;

a vertex position detection unit that detects the vertexes of the projected images based on data relating to the plurality of images captured by the plurality of cameras, and that outputs image edge data indicating positions of the vertexes; and a projector control unit that adjusts, when the vertexes of the projected images shift from preset reference positions, scanning ranges of the two-dimensional scanning projectors so that the vertexes can match the reference positions.

A screen forming method for a multiprojection display system in which a plurality of two-dimensional scanning projectors project square images onto a screen, and the plurality of projected images are connected on the screen to form one screen, includes:

capturing images of predetermined vertex regions including vertexes of the projected images during a predetermined period including a display start row of one frame of the projected image or a predetermined period including a display end row by a plurality of cameras;

detecting the vertexes of the projected images based on data relating to the plurality of images captured by the plurality of cameras by a control unit; and adjusting, when the vertexes of the projected images shift from preset reference positions, scanning ranges of the two-dimensional scanning projectors so that the vertexes can match the reference positions by the control unit.

BRIEF DESCRIPTION OF DRAWINGS

FIG. 10 shows schematic views each showing a processing example during a display period of one frame of a multiprojection display system according to a sixth exemplary embodiment.

EXEMPLARY EMBODIMENT

Next, the present invention is described with reference to the drawings.

Hereinafter, a multiprojection display system according to the present invention is described by using a configuration example of a rear-projection-type projector that includes a plurality of laser projectors for forming square images by horizontally and vertically scanning laser beams of three colors, namely, R (red), G (green), and B (blue), projected onto a screen. The present invention can be applied to a configuration that uses a two-dimensional scanning projector (hereinafter, simply scanning projector) for forming an image on a screen by using, for example, a LED (Light Emitting Diode) or other light sources. Therefore, the type of a light source is not limited to a laser beam. Not limited to the rear-projection-type projector, the present invention can be applied to a front-projection-type projector that projects an image onto the screen from the front surface. A configuration of the laser projector is described in, for example, Japanese Patent Laid-Open No.2005-18040.

Each exemplary embodiment is described below by using an example where four scanning projectors rear-project images to form one screen on a screen. However, the number of projectors used for forming a screen is not limited to four. Any number of projectors can be used as lone as it is equal to or more than two.

(First Exemplary Embodiment)

Figure 1:
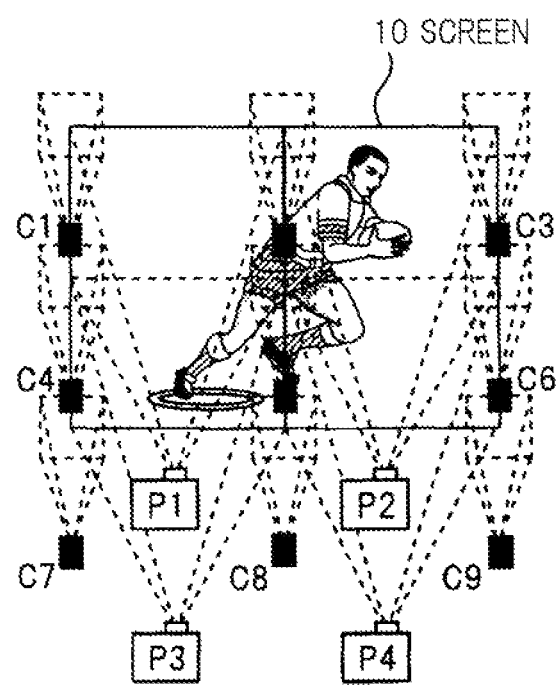
FIG. 1 is a schematic view showing an overall picture of a multiprojection display system according to the present invention.
Figure 2:
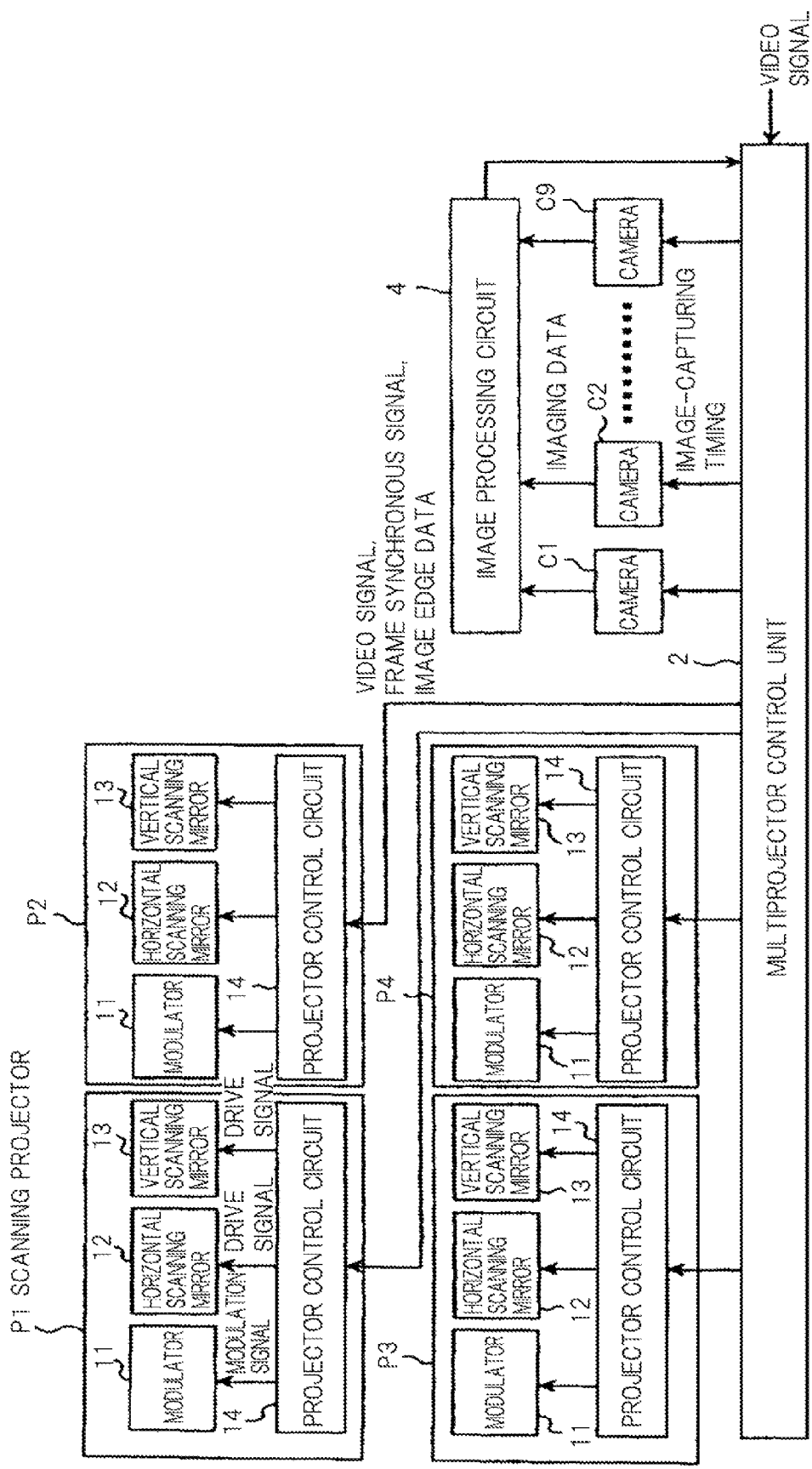
FIG. 2 is a block diagram showing a configuration example of a multiprojection display system according to a first exemplary embodiment.

FIG. 1 is a schematic view showing an overall picture of a multiprojection display system according to a first exemplary embodiment. FIG. 2 is a block diagram showing a configuration example of the multiprojection display system according to the first exemplary embodiment.

As shown in FIG. 1, the multiprojection display according to the first exemplary embodiment is configured such that, for example, four scanning projectors P1 to P4 rear-project square images on screen 10 to form one image.

A plurality of cameras are installed on a rear surface side of screen 10 to detect positions of the images projected from scanning projectors P1 to P4. The cameras are located to capture images of predetermined regions including vertexes of the square images. In FIG. 1, nine cameras C1 to C9 are arranged to capture the projected images divided into four near the vertexes. In FIG. 1, images of regions which can be captured by the cameras (image-capturing region) are indicated by ranges surrounded with square dotted lines. In FIGS. 4 to 6 and FIGS. 8 to 10 described below, ranges surrounded with square dotted lines on screens indicate camera's image-capturing regions.

As shown in FIG. 2, the multiprojection display system according to the first exemplary embodiment includes a plurality (four in FIG. 2) of scanning projectors P1 to P4, multiprojector control unit 2 that controls operations of scanning projectors P1 to P4, cameras C1 to C9 that capture portions near vertexes of the images projected from scanning projectors P1 to P4, and image processing circuit 4 that processes data relating to the images captured by cameras C1 to C9.

Each of scanning projectors P1 to P4 includes a laser light source (not shown), modulator 11 that modulates intensity of a laser beam emitted from the light source based on a video signal corresponding to a scanning position, horizontal scanning mirror 12 for scanning the laser beam emitted from modulator 11 in a horizontal direction, vertical scanning mirror 13 for scanning the laser beam emitted from modulator 11 in a vertical direction, and projector control circuit 14 that generates a drive signal for operating horizontal scanning mirror 12 and vertical scanning mirror 13, and a modulation signal for causing modulator 11 to change the intensity of the laser beam based on the video signal supplied from the outside.

After having received the video signal from the outside to be projected onto screen 10, multiprojector control unit 2 divides the video signal into four corresponding to images to be displayed on scanning projectors P1 to P4, supplies the generated video signals to scanning projectors P1 to P4, and transmits a frame synchronous signal indicating scanning timing. Multiprojector control unit 2 can be configured to receive four video signals corresponding to scanning projectors P1 to P4. In this case, multiprojector control unit 2 is not required to generate the divided video signals.

Multiprojector control unit 2 transmits an image-capturing timing signal to instruct image-capturing timing to each of cameras C1 to C9. Specifically, multiprojector control unit 2 also operates as an image-capturing timing control unit to control each of cameras C1 to C9 to capture an image on screen 10 during a predetermined period including a display start row of one frame of the image projected from each of scanning projectors P1 to P4 or a predetermined period including a display end row.

Each projector control circuit 14 supplies the drive signal to horizontal scanning mirror 12 and vertical scanning mirror 13 based on the frame synchronous signal received from multiprojector control unit 2, and supplies a modulation signal generated based on the video signal received from multiprojector control unit 2 to modulator 11.

Image processing circuit 4 detects vertexes of the images projected from scanning projectors P1 to P4 from the data relating to the images captured by cameras C1 to C9, and outputs image edge data indicating positions of the vertexes to multiprojector control unit 2. In other words, image processing circuit 4 also operates as a vertex position detection unit to detect the vertexes of the projected images from the data relating to the plurality of images captured by cameras C1 to C9, and to output the image edge data indicating the positions of the vertexes.

Multiprojector control unit 2 supplies the image edge data received from image processing circuit 4 to projector control circuit 14 of each of corresponding scanning projectors P1 to P14.

Projector control circuit 14 determines whether the vertex of the projected image has shifted from a preset reference position based on the image edge data, and determines whether a scanning range of horizontal scanning mirror 12 or vertical scanning mirror 13 must be adjusted. When adjustment is necessary, a position of the projected image and a width thereof in the horizontal direction or the vertical direction are adjusted based on the drive signal supplied to horizontal scanning mirror 12 or vertical scanning mirror 13 to be adjusted.

The horizontal scanning range of the projected image can be controlled based on a voltage (amplitude value) of the drive signal supplied to horizontal scanning mirror 12, and the vertical scanning range of the projected image can be controlled based on a voltage (amplitude value) of the drive signal supplied to vertical scanning mirror 13.

For example, the horizontal scanning range is widened when the amplitude value of the drive signal supplied to horizontal scanning mirror 12 is set large, and narrowed when the amplitude value is set small. Vertical scanning mirror 13 can similarly be controlled. Determination as to the necessity of adjustment of the scanning range, and adjustment of the drive signal of the scanning mirror can be executed by multiprojector control unit 2. In the scope of the claims of the present invention, a configuration for determining the necessity of adjusting the scanning range and executing adjustment of the drive signal of the scanning mirror is referred to as a "projector control unit".

Multiprojector control unit 2 and image processing circuit 4 included in the multiprojection display system according to the exemplary embodiment, and projector control circuit 14 included in each of scanning projectors P1 to P4 can be achieved by, for example, a computer including a CPU (Central Processing Unit) for executing processing based on a program, a DSP (Digital Signal Processor) for executing a predetermined arithmetic operation, an A/D (Audio/Digital) converter, a D/A (Digital/Audio) converter, a memory, and various arithmetic and logic circuits.

Figure 3:
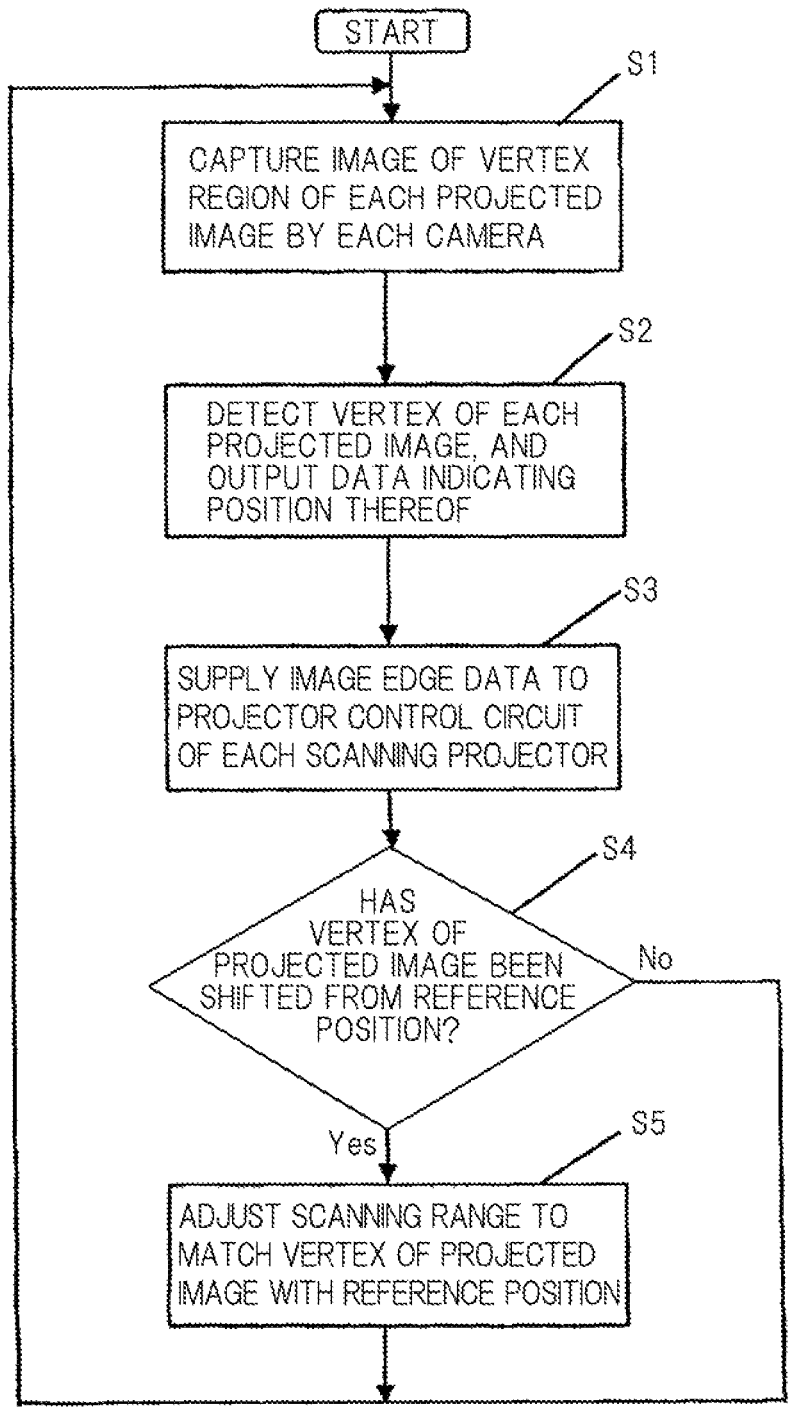
FIG. 3 is a flowchart showing a processing procedure of the multiprojection display system according to the present invention.

FIG. 3 is a flowchart showing a processing procedure of the multiprojection display system according to the present invention.

As shown in FIG. 3, in the multiprojection display system according to the exemplary embodiment, cameras C1 to C9 capture images of predetermined vertex regions including the vertexes of the projected images during a predetermined period including a display start row of one frame of each projected image or a predetermined period including a display end row (step SI).

Image processing circuit 4 detects the vertexes of the images projected from scanning projectors P1 to P4 from data relating to the images captured by cameras C1 to C9, and outputs image edge data indicating positions of the vertexes of the projected images to multiprojector control unit 2 (step S2).

Multiprojector control unit 2 supplies the image edge data received from image processing circuit 4 to projector control circuit 14 of each of corresponding scanning projectors P1 to P4 (step S3).

Each multiprojector projector control unit 14 determines whether the vertex of the projected image has shifted from the preset reference position based on the image edge data (step S4). When the vertex of the projected image has shifted, a scanning range of each of scanning projectors P1 to P4 is adjusted to match the vertex with the reference position (step S5). On the other hand, when the vertex of the projected image has not shifted from the preset reference position, the processing returns to step S1 to repeat steps S1 to S5.

Figure 4:
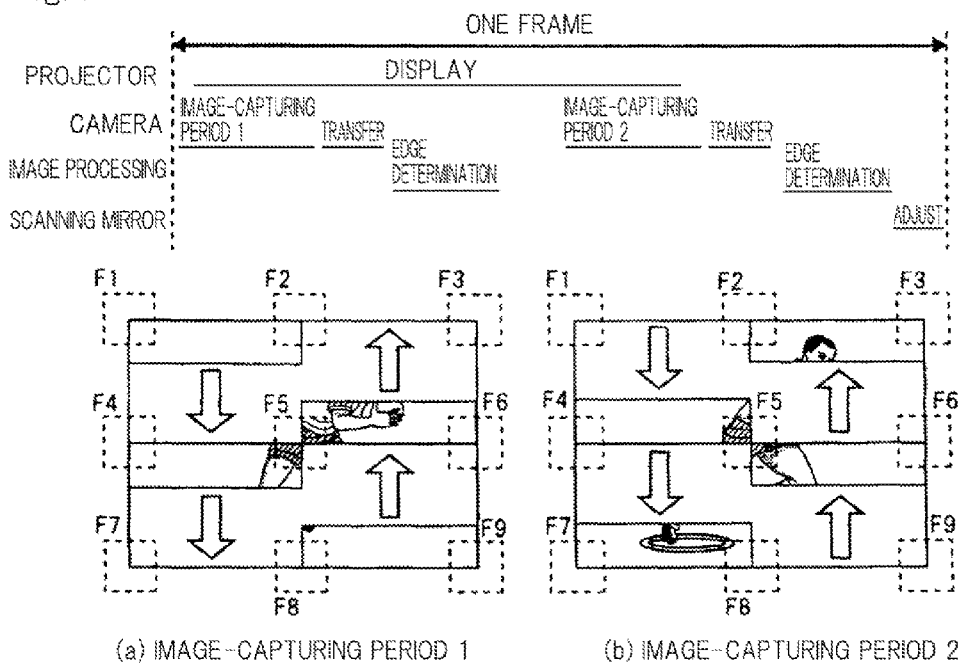
FIG. 4 shows schematic views each showing a processing example during a display period of one frame of the multiprojection display system shown in FIG. 1.

FIG. 4 shows schematic views each showing a processing example during a display period of one frame of the multiprojection display system shown in FIG. 1.

As shown in FIG. 4, in the multiprojection display according to the first exemplary embodiment, projector control circuits 14 included in scanning projectors P1 to P4 set different vertical scanning directions between scanning projectors P1 and P3 that constitute, among four divided screens, two screens of the left side, and scanning projectors P2 and P4 that constitute two screens of a right side. In other words, among a plurality of images to form one screen, images adjacent to each other in a horizontal direction are formed by scanning in different directions in a vertical direction. For example, scanning projectors P1 and P3 that constitute the two screens of the left side form images by scanning downward, and scanning projectors P2 and P4 that constitute the two screens of the right side form images by scanning upward. Regions F1 to F9 indicated by dotted lines illustrated in FIG. 4 represent image-capturing regions corresponding to cameras C1 to C9. Regions F1 to F9 indicated by dotted lines in FIGS. 5, 6, 9, and 10 similarly indicate image-capturing regions.

Cameras C1 to C9 capture images during, in a display period of one frame of an image by the scanning projector, a predetermined period (image-capturing period 1 illustrated in FIG. 4(a)) including a display start row of the image or a predetermined period (image-capturing period 2 illustrated in FIG. 4(b)) including a display end row. FIG. 4(a) shows an image example captured by each of cameras C1 to C9 during the image-capturing period 1. FIG. 4(b) shows an image example captured by each of cameras C1 to C9 during the image-capturing period 2. Cameras C1 to C9 that have captured images transfer data relating to the captured images to image processing circuit 4.

After having acquired the data relating to the captured images from cameras C1 to C9, image processing circuit 4 determines an edge (end side) of each projected image as described below, and detects each vertex.

As described above, the scanning projector that constitutes the two screens of the left side scans downward, while the scanning projector that constitutes the two screens of the right side scans upward. Thus, each of cameras C1 to C9 never simultaneously captures both images adjacent to each other in the vertical direction and the horizontal direction during each image-capturing period.

The image captured by each of cameras C1 to C9 accordingly includes an edge of the projected image and a region where no projected image around the edge is displayed. Thus, the edge (end side) of the projected image can be identified from the captured image, and a vertex overlapped with the edge of the projected image can be detected. The edge of the projected image can be detected by executing, for example, well-known Laplacian filer processing for the data relating to the images captured by cameras C1 to C9.

When a result of detecting the vertex of the projected image shows that the vertex of the projected image has shifted from the preset reference position, a scanning range of the projected image by each of scanning projectors P1 to P4 is adjusted so that the vertex can match the reference position.

The reference position of the vertex of the projected image can be arbitrarily set in the image captured by each of cameras C1 to C9 as long as positional and distance relationships between cameras C1 to C9 and the screen are fixed. For example, when a center of the image captured by each of cameras C1 to C9 is set as a reference position, horizontal scanning mirror 12 and vertical scanning mirror 13 can be controlled so that the detected vertex of the projected image can match the image center. When positional and distance relationships between each of cameras C1 to C9 and the screen are difficult to be accurately maintained, for example, a marker indicating the reference position of the vertex of each projected image can be added to the screen, and control can be executed so that the detected vertex of the projected image can match a position of the marker.

According to the multiprojection display system of the exemplary embodiment, the vertex of each projected image is detected to adjust a position of the image to be projected onto the screen. Hence, no test image is necessary to adjust an image position. A position of the image projected from each of scanning projectors P1 to P4 can be adjusted in real time. Thus, the necessity of interrupting projection of images to individually adjust the scanning projectors each time the projected images shift in position due to environmental changes can be eliminated. As a result, convenience in using an image display apparatus can be improved.

(Second Exemplary Embodiment)

The multiprojection display system according to the first example has been described by taking the example where the scanning directions in the vertical direction are different between scanning projectors P1 and P3 that constitute, among the four divided screens, the two screens of the left side, and scanning projectors P2 and P4 that constitute the two screens of the right side.

A multiprojection display system according to a second exemplary embodiment is configured such that scanning projectors P1 and P3 that constitute, among four divided screens, two screens of a left side and scanning projectors P2 and P4 that constitute two screens of a right side form images by scanning in the same direction in a vertical direction. In other words, the scanning projectors form images adjacent to each other in a horizontal direction by scanning in the same direction in the vertical direction. Other components and processing of the multiprojection display system are similar to those of the first exemplary embodiment, and thus description thereof is omitted.

Figure 5:
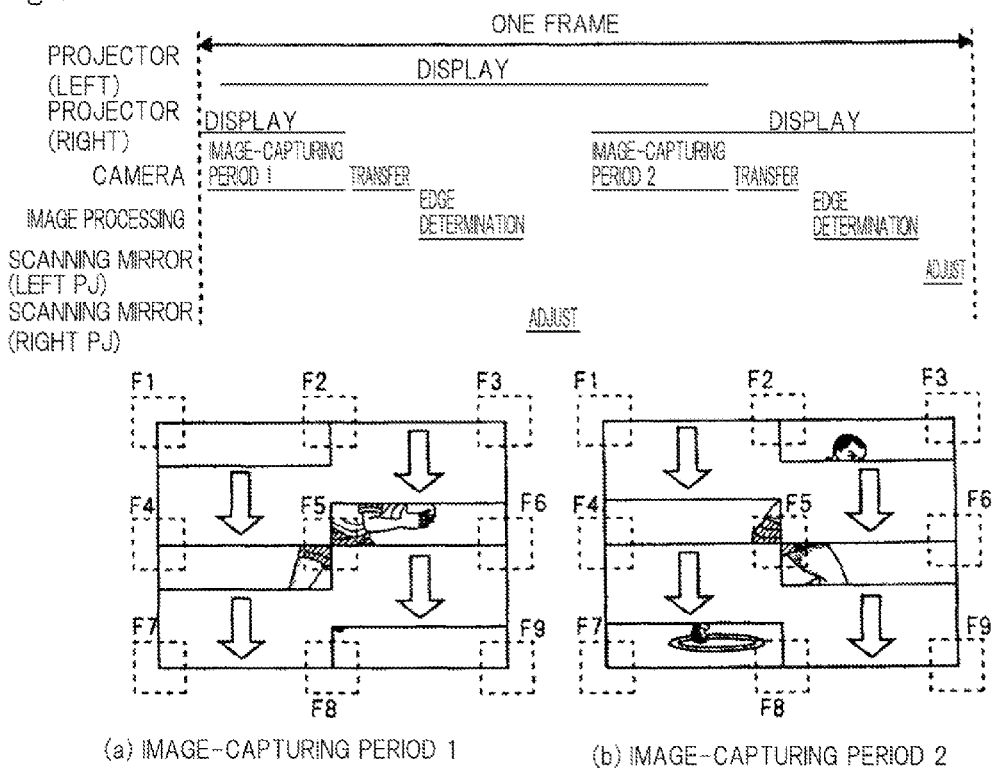
FIG. 5 shows schematic views each showing a processing example during a display period of one frame of a multiprojection display system according to a second exemplary embodiment.

FIG. 5 shows schematic views each showing a processing example during a display period of one frame of the multiprojection display system according to the second exemplary embodiment.

As shown in FIG. 5, according to the second exemplary embodiment, scanning projectors P1 and P3 constituting the two screens of the left side and scanning projectors P2 and P4 constituting the two screens of the right side scan in the same direction in the vertical direction, and the display timing of each image is shifted between the two screens of the left side and the two screens of the right side to prevent cameras C1 to C9 from simultaneously capturing both images adjacent to each other in the vertical direction and the horizontal direction. For example, at the scanning end time within one frame of scanning projectors P1 and P3, the display timing is shifted at an interval where information (vertex on the start side) at the scanning start time within one frame of scanning projectors P2 and P4 can be captured. This interval is set according to a shutter speed (image-capturing time) of the camera that captures images. FIG. 5(a) shows an image example captured by each of cameras C1 to C9 during an image-capturing period 1, and FIG. 5(b) shows an image example captured by each of cameras C1 to C9 during an image-capturing period 2.

According to the exemplary embodiment, even when scanning directions are set identical between the two screens of the left side and the two screens of the right side, shifting display timing enables detection of an image edge of each projected image as in the case of the first exemplary embodiment. Thus, as in the case of the first exemplary embodiment, no test image is necessary to adjust an image position. A position of the image projected from each of the scanning projectors can be adjusted in real time.

(Third Exemplary Embodiment)

Generally, the contrast of an image on a screen is reduced due to external light such as illumination light or natural light. Hence, a vertex of a projected image may not be accurately detected when no image of high contrast is displayed at an image edge. A third exemplary embodiment is directed to a method of eliminating an influence of such external light in a multiprojection display system.

Figure 6:
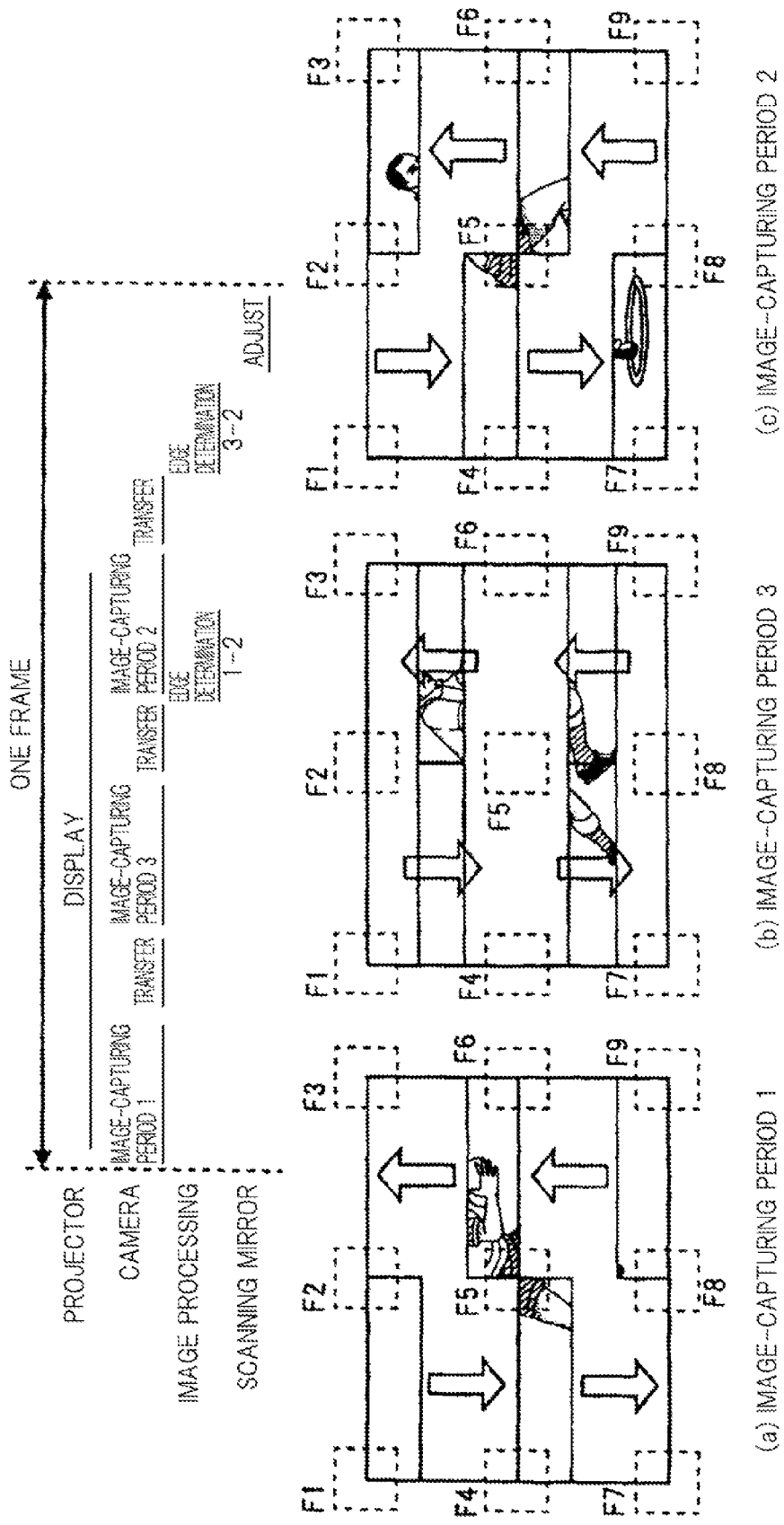
FIG. 6 shows schematic views each showing a processing example during a display period of one frame of a multiprojection display system according to a third exemplary embodiment.

FIG. 6 is schematic views each showing a processing example during a display period of one frame of the multiprojection display system according to the third exemplary embodiment.

As shown in FIG. 6, in the multiprojection display system according to the third exemplary embodiment, each of cameras C1 to C9 captures an image during a predetermined period (image-capturing period 1 shown in FIG. 6(a)) including a display start row of the image within one frame or a predetermined period (image-capturing period 2 shown in FIG. 6(c)) it) including a display end row, and captures an image on a screen even during a period (image-capturing period 3 shown in FIG. 6(b)) where nothing is displayed in an image-capturing region of each of cameras C1 to C9. FIG. 6(a) shows an image example captured by each of cameras C1 to C9 during the image-capturing period 1. FIG. 6(b) shows an image example captured by each of cameras C1 to C9 during the image-capturing period 3. FIG. 6(c) shows an image example captured by each of cameras C1 to C9 during the image-capturing period 2. Image-capturing timing of each of cameras C1 to C9 is controlled based on an image-capturing timing signal output from multiprojection control unit 2.

Image processing circuit 4 calculates a difference between data relating to the image captured during the predetermined period including the display start row or the predetermined period including the display end row and data relating to the image captured during the period where nothing is displayed in the image-capturing region, and acquires data relating to a captured image of the difference where an influence of external light has been eliminated. The influence of the external light is eliminated because the data relating to the image captured during the period where nothing is displayed in the image-capturing region indicates only the influence of the external light. The image-capturing timing period of the captured image data becomes the predetermined period between the predetermined period including the display start row and the predetermined period including the display end row. Other components and processing are similar to those of the first exemplary embodiment or the second exemplary embodiment, and thus description thereof is omitted.

According to the multiprojection display system according to the third exemplary embodiment, in addition to the same effects as those of the first exemplary embodiment, a vertex of each projected image can be detected more accurately even when contrast of an image projected onto the screen is reduced due to the influence of the external light.

(Fourth Exemplary Embodiment)

In an image projected onto a screen from a projector, distortion (barrel distortion), where the center of an image edge swells from an image center or distortion (bobbin distortion) and where the center of the image edge contracts toward the image center, may occur. In such a case, positional shifting occurs near the center of the image edge even when the vertex of the projected image does not shift from a reference position.

The fourth exemplary embodiment is directed to a method of adjusting a position of the vertex of each projected light while correcting barrel distortion or bobbin distortion generated in the projected image.

Figure 7:
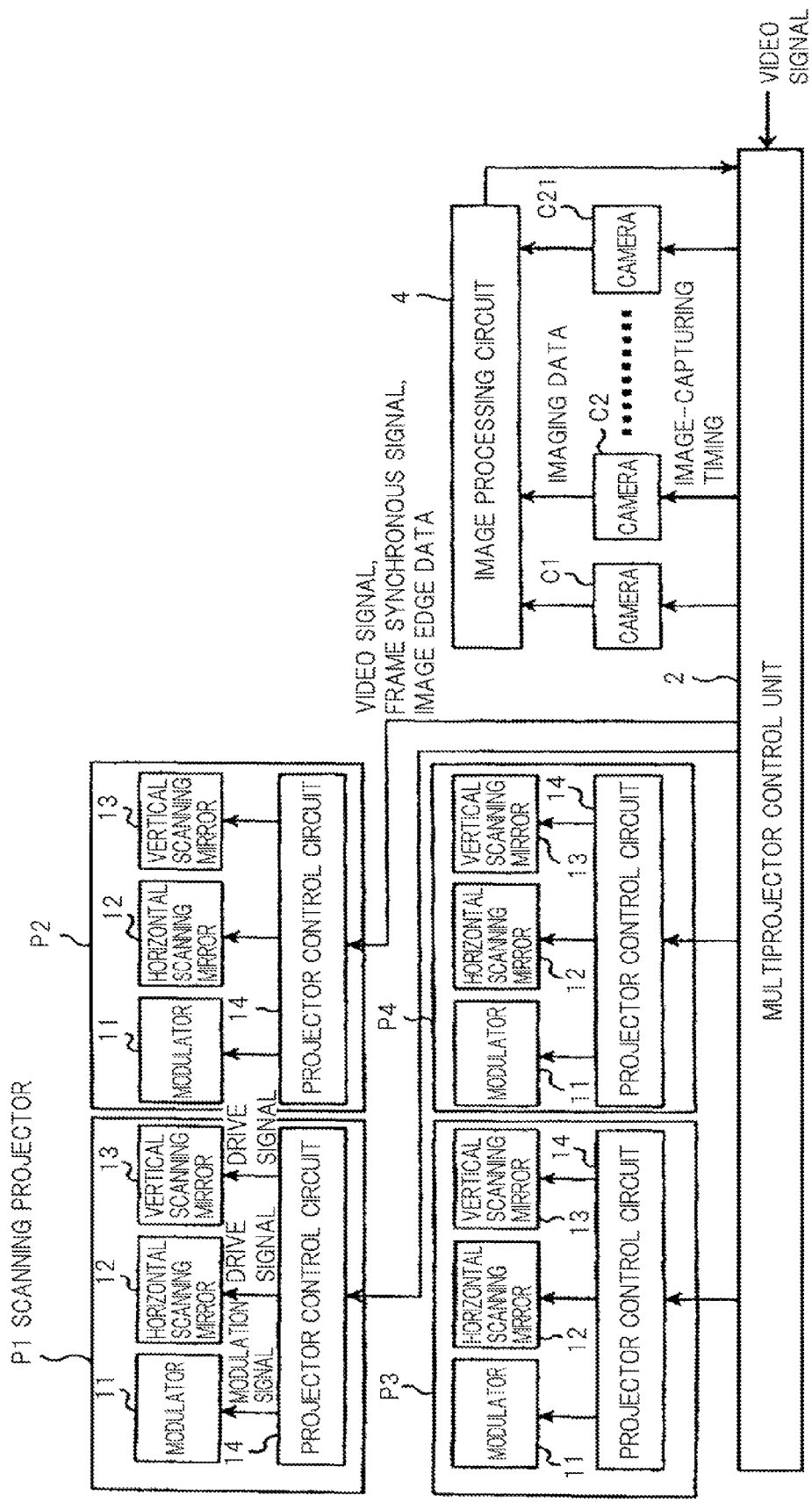
FIG. 7 shows a schematic view showing a configuration example of a multiprojection display system according to a fourth exemplary embodiment.

FIG. 7 is a schematic view showing a configuration example of a multiprojection display system according to the fourth exemplary embodiment.

As shown in FIG. 7, the multiprojection display system according to the fourth exemplary embodiment includes nine cameras C1 to C9 that capture images near vertexes of four divided images and twelve cameras C10 to C21 that capture images near centers of image edges. Other components are similar to those of the multiprojection display system of the first exemplary embodiment shown in FIG. 2, and thus description thereof is omitted.

Figure 8:
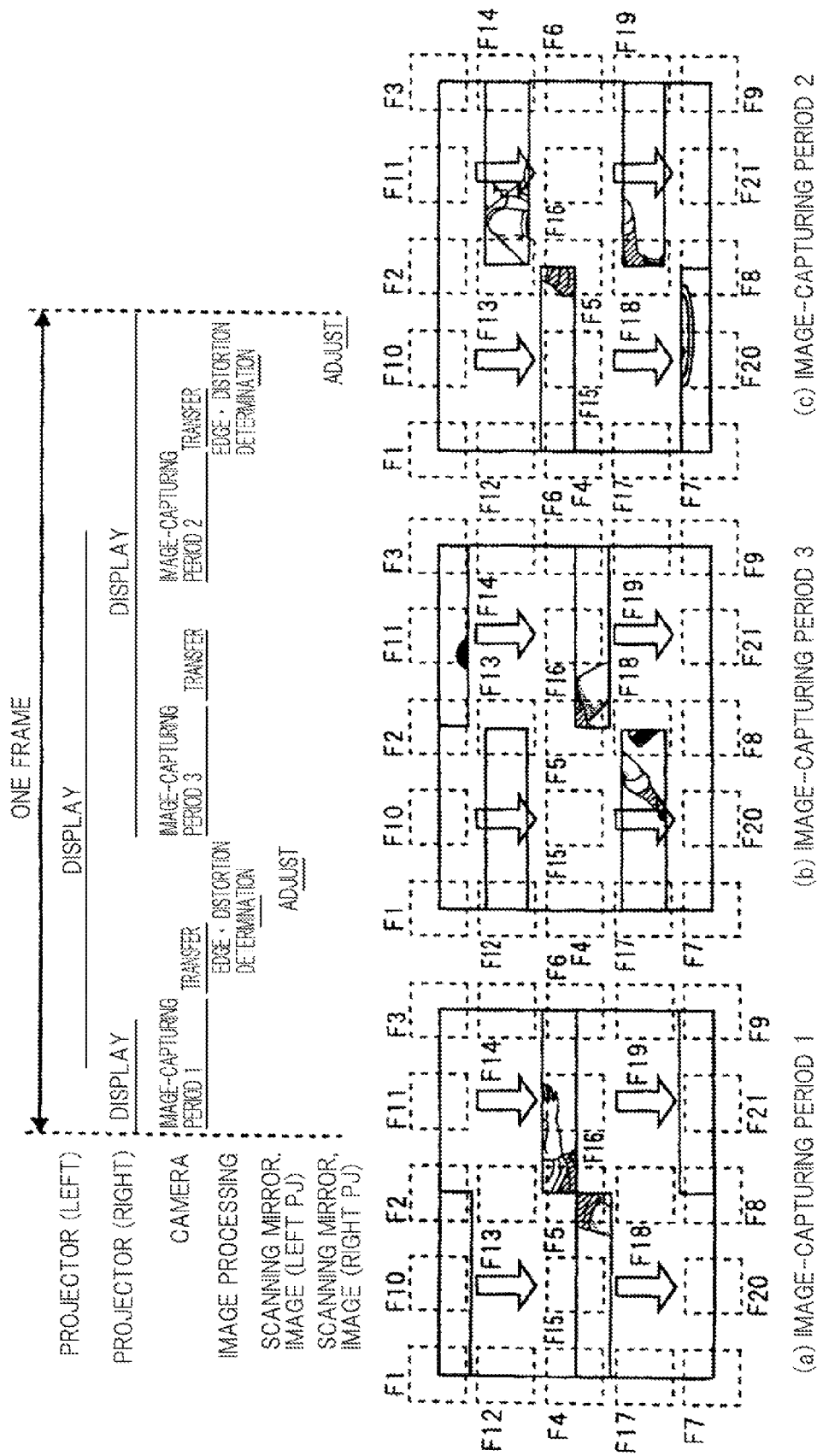
FIG. 8 shows schematic views each showing a processing example during a display period of one frame of a multiprojection display system according to the fourth exemplary embodiment.

FIG. 8 shows schematic views each showing a processing example during a display period of one frame of the multiprojection display system according to the fourth exemplary embodiment.

In the multiprojection display system according to the fourth exemplary embodiment, cameras C1 to C21 are installed on a rear surface side of the screen to capture images near vertexes of projected images and images near centers of image edges. In FIG. 8, image-capturing regions corresponding to nine cameras C1 to C9 that capture the images near the vertexes of the four divided images and twelve cameras C10 to C21 that capture the images near the centers of the image edges are indicated by F1 to F21 (regions indicated by dotted lines).

According to the fourth exemplary embodiment, cameras C1 to C21 capture the images near the vertexes of the projected images and the images near the centers of the image edges. FIG. 8(a) shows an image example captured by each of cameras C1 to C21 during an image-capturing period 1. FIG. 8(b) shows an image example captured by each of cameras C1 to C21 during an image-capturing period 3. FIG. 8(c) shows an image example captured by each of cameras C1 to C21 during an image-capturing period 2.

Image processing apparatus 4 according to the exemplary embodiment outputs vertex data indicating a vertex of each projected image to multiprojector control unit 2 based on data relating to the captured image near the vertex of the image captured by each of cameras C1 to C9, and image edge data indicating an edge of each projected image to multiprojector control unit 2 based on data relating to the image near the center captured by each of cameras C10 to C21. Multiprojector control unit 2 supplies the image edge data received from image processing apparatus 4 to projector control circuit 14 of the corresponding scanning projector.

Projector control circuit 14 detects distortion of each projected image based on the image edge data, and performs distortion correction conversion to correct the distortion for a video signal. In the distortion correction conversion, the distortion is corrected so that the edge of the projected image can nearly become rectangular in the horizontal or vertical direction. Specifically, by using a straight line connecting vertex positions as a reference, amplitude of a scanning mirror is gradually reduced near the center of edge when the edge swells outside. When the edge contracts inside, the amplitude of the scanning mirror is gradually increased near the center of edge. in this way, the distortion is corrected. For distortion correction, a well-known correction method can be used according to a type of the distortion. The exemplary embodiment is in no way limitative of a correction method.

Projector control circuit 14 generates a modulation signal based on the video signal after the distortion correction, and supplies the modulation signal to modulator 11. When the vertex of the projected image after the distortion correction shifts from a reference position, a drive signal supplied to horizontal scanning mirror 12 and vertical scanning mirror 13 is adjusted to match the vertex of the projected image with the reference position. Other components and processing are similar to those of the first exemplary embodiment or the second exemplary embodiment, and thus description thereof is omitted.

According to the multiprojection display of the fourth exemplary embodiment, as in the case of the first exemplary embodiment, the position of the image projected from each of scanning projectors P1 to P4 can be adjusted in real time, and the distortion of the projected image can be corrected.

(Fifth Exemplary Embodiment)

Figure 9:
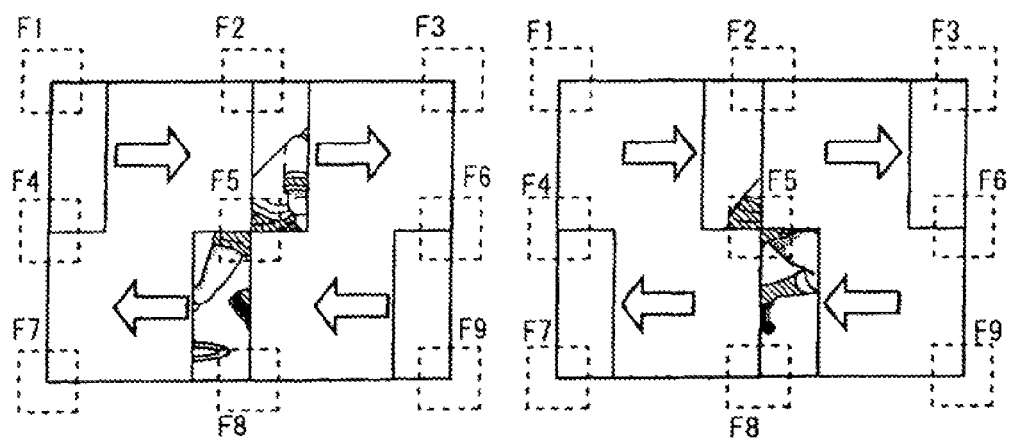
FIG. 9 shows schematic views each showing a processing example during a display period of one frame of a multiprojection display system according to a fifth exemplary embodiment.

FIG. 9 shows schematic views each showing a processing example during a display period of one frame of a multiprojection display system according to a fifth exemplary embodiment.

Scanning projectors P1 to P4 according to the first exemplary embodiment or the second exemplary embodiment form the projected images by scanning light projected from modulator 11 onto the screen from a screen left edge (or right edge) to the screen right edge (or left edge) in the horizontal direction, and by gradually moving its locus (scanning line) to the vertical direction. However, because of physical constraints, the scanning projector may be configured to form a projected image by vertically scanning the light projected from modulator 11 onto the screen from a screen lower edge (or upper edge) to the screen upper edge (or lower edge), and by gradually moving its locus (scanning line) in the horizontal direction.

With this configuration, as shown in FIG. 9, different horizontal scanning directions are set between scanning projectors P1 and P2 that constitute, among four divided screens, two screens of an upper side, and scanning projectors P3 and P4 that constitute two screens of a lower side. For example, scanning projectors P1 and P2 constituting the two screens of the upper side form images by scanning from left to right, and scanning projectors P3 and P4 constituting the two screens of the lower side form images by scanning from left to right.

Cameras C1 to C9 capture images during, in a display period of one frame of the image projected onto the screen, a predetermined period including a display start column of the image and during a predetermined period including a display end column. Hence, cameras C1 to C9 never simultaneously capture both images adjacent to each other in the vertical direction and the horizontal direction during each image-capturing period.

When the display timing of each image is set different between the two screens of the upper side and the two screens of the lower side to prevent cameras C1 to C9 from simultaneously capturing both images adjacent to each other in the vertical direction and the horizontal direction, scanning directions in the horizontal direction can be set identical between scanning projectors P1 and P2 that constitute the two screens of the upper side and scanning projectors P3 and P4 that constitute the two screens of the lower side.

According to the exemplary embodiment, even when scanning directions in the horizontal direction are set different between scanning projectors P1 and P2 that constitute the two screens of the upper side and scanning projectors P3 and P4 that constitute the two screens of the lower side, or when the display timing of each image is set different between the two screens of the upper side and the two screens of the lower side, as in the case of the first exemplary embodiment or the second exemplary embodiment, a vertex of each projected image can be detected. As a result, the position of the image projected onto the screen can be adjusted, and the positions of the images projected from scanning projectors P1 to P4 can be adjusted in real time.

(Sixth Exemplary Embodiment)

In a multiprojection display that forms one screen by projecting images from a plurality of projectors onto a screen, correction of color misregistration of the images projected from the projectors is important for suppressing quality deterioration of the projected images.

A sixth exemplary embodiment is directed to a method of correcting color misregistration of the images projected from the plurality of scanning projectors.

FIG. 10 shows schematic views each showing a processing example during a display period of one frame of a multiprojection display system according to the sixth exemplary embodiment.

As shown in FIG. 10, in the multiprojection display system according to the sixth exemplary embodiment, as in the case of the third exemplary embodiment, each of cameras C1 to C9 captures an image on a screen during a predetermined period (image-capturing period 1 shown in FIG. 10(a)).including a display start row of the image within one frame or a predetermined period (image-capturing period 2 shown in FIG. 10(c)) including a display end row, and captures an image on a screen even during a period (image-capturing period 3 shown in FIG. 10(b)) where nothing is displayed in an image-capturing region of each of cameras C1 to C9. FIG. 10(a) shows an image example captured by each of cameras C1 to C9 during the image-capturing period 1. FIG. 10(b) shows an image example captured by each of cameras C1 to C9 during the image-capturing period 3. FIG. 10(c) shows an image example captured by each of cameras C1 to C9 during the image-capturing period 2.

Multiprojector control unit 2 according to the exemplary embodiment compares captured image data supplied from image processing circuit 4 with a video signal input from the outside, and determines whether there is a difference in brightness in colors R, G, and B between adjacent projectors. In this case, multiprojector control unit 2 preferably determines, by using the processing of the third exemplary embodiment, whether there is a difference in brightness in color between adjacent projected images while eliminating an influence of external light.

When adjustment is determined to be necessary because of a difference in brightness for one of the colors R, G, and B, multiprojector control unit 2 transmits color adjustment data for adjusting the amount of light of a laser light source to be adjusted to projector control circuit 14 included in the scanning projector to be adjusted.

Projector control circuit 14 adjusts the amount of light of the laser light source by 1.5 controlling a current supplied to the laser light source to be adjusted based on the color adjustment data received from multiprojector control unit 2. The brightness of each of the colors R, G, and B can be adjusted based on an amplitude value of a modulation signal supplied to modulator 11.

According to the multiprojection display of the sixth exemplary embodiment, as in the case of the first exemplary embodiment, positions of a plurality of images can be adjusted in real time, and color misregistration of each image can be adjusted.

The exemplary embodiments of the present invention have been described. However, the exemplary embodiments are in no way imitative of the invention. Various changes and modifications understandable to those skilled in the art can be made of the configuration and the specifics of the present invention within the scope of the invention.

This application claims priority from Japanese Patent Application No. 2009-082216 filed Mar. 30, 2009, which is hereby incorporated by reference herein in its entirety.

The invention claimed is:

1. A multiprojection display system in which a plurality of two-dimensional scanning projectors project images onto a screen, comprising:
   a set of cameras that capture images of predetermined vertex regions including vertexes of said projected images;
   an image-capturing timing control unit that controls said set of cameras to capture a set of images on said screen during a predetermined period, selected based on a scanning direction or scanning timing of said two-dimensional scanning projectors;
   a vertex position detection unit that determines, based on the captured set of images, for each of the projected images, an edge that is adjacent to a region outside of the projected image, detects the vertexes of said projected images based on the edge determination, and outputs data indicating positions of the detected vertexes; and
   a projector control unit that adjusts a scanning range of at least one of the two-dimensional scanning projectors based on a determination that at least one of the detected vertexes is shifted from a reference position of the at least one detected vertex.

2. The multiprojection display system according to claim 1, wherein:
   said projector control unit forms, among said plurality of projected images, projected images adjacent to each other in a horizontal direction by scanning in the same direction in a vertical direction at different timings; and
   said timings are set to prevent simultaneous capturing of both projected images adjacent to each other in the vertical direction and the horizontal direction during said predetermined period.

3. The multiprojection display system according to claim 1, wherein said projector control unit forms, among said plurality of projected images, projected images adjacent to each other in a vertical direction by scanning in different directions in a horizontal direction.

4. The multiprojection display system according to claim 1, wherein said projector control unit forms, among said plurality of projected images, projected images adjacent to each other in a vertical direction by scanning in the same direction in a horizontal direction, and both projected images adjacent to each other in the vertical direction and the horizontal direction are displayed at different timings to be prevented from being simultaneously captured during said predetermined period.

5. The multiprojection display system according to claim 1, wherein:
   said cameras capture the images on said screen during the predetermined period including a display start row of one frame of said projected image or the predetermined period including a display end row, and capture the images on said screen during a period where nothing is displayed in the image-capturing regions of the cameras; and
   said projector control unit calculates a difference between data relating to the images captured by said cameras during the predetermined period including said display start row or the predetermined period including said display end row and data relating to the images captured during the period where nothing is displayed in said image-capturing regions, and detects the vertexes of the images projected from said scanning projectors based on captured image data of the difference.

6. The multiprojection display system according to claim 1, wherein the cameras are installed in positions to capture images of predetermined regions including centers of edges of said projected images, and
wherein said projector control unit detects distortion of the images projected from said two-dimensional scanning projectors based on captured image data acquired by capturing images of predetermined edge regions including the edge centers of said projected images by said cameras, and corrects the distortion of the projected images.

7. The multiprojection display system according to claim 1, further comprising a multiprojector control unit that determines whether there is any difference in brightness of each of colors R, G and B between the images projected by the two-dimensional scanning projectors based on the data relating to the images captured by said cameras, and outputs color adjustment data for adjusting the amounts of light of the colors whose difference in brightness needs to be adjusted,
wherein said projector control unit adjusts the amount of light of the colors to be adjusted based on said color adjustment data.

8. A screen forming method for a multiprojection display system in which a plurality of two-dimensional scanning projectors project images onto a screen, comprising:
capturing by a set of cameras, a set of images of predetermined vertex regions including vertexes of said projected images during a predetermined period selected based on a scanning direction or scanning timing of said two-dimensional scanning projectors;
determining, based on the captured set of images, for each of the projected images, an edge that is adjacent to a region outside of the projected image;
detecting the vertexes of said projected images based the edge determination; and
adjusting a scanning range of at least one of the two-dimensional scanning projectors based on a determination that at least one of the detected vertexes is shifted from a reference position of the at least one detected vertex.

9. The screen forming method according to claim 8, further comprising:
forming, among the plurality of projected images, projected images adjacent to each other in a horizontal direction by scanning in the same direction in a vertical direction at different timings, wherein
said timings are set to prevent simultaneous capturing of both projected images adjacent to each other in the vertical direction and the horizontal direction during said predetermined period.

10. The screen forming method according to claim 8, further comprising forming, among said plurality of projected images, projected images adjacent to each other in a vertical direction by scanning in different directions in a horizontal direction.

11. The screen forming method according to claim 8, further comprising forming, among said plurality of projected images, projected images adjacent to each other in a vertical direction by scanning in the same direction in a horizontal direction, and wherein both projected images adjacent to each other in the vertical direction and the horizontal direction are displayed at different timings to be prevented from being simultaneously captured during said predetermined period.

12. The screen forming method according to claim 8, further comprising:
capturing, using said cameras, the images on said screen during the predetermined period including a display start row of one frame of said projected image or the predetermined period including a display end row, and capturing, using said cameras, the images on said screen during a period where nothing is displayed in the image-capturing regions of said cameras; and
calculating a difference between data relating to the images captured by said cameras during the predetermined period including said display start row or the predetermined period including said display end row and data relating to the images captured during the period where nothing is displayed in said image-capturing regions, and detecting the vertexes of said images projected from said scanning projectors based on captured image data of the difference.

13. The screen forming method according to claim 8, further comprising:
capturing, using said cameras, images of predetermined regions including centers of edges of said projected images; and
detecting distortion of the images projected from said two-dimensional scanning projectors based on captured image data acquired by capturing images of predetermined edge regions including the edge centers of said projected images by said cameras, and correcting the distortion of the projected images.

14. The screen forming method according to claim 8, further comprising determining whether there is any difference in brightness of each of colors R, G and B between the images projected by the two-dimensional scanning projectors based on the data relating to the images captured by said cameras, and outputting color adjustment data for adjusting the amount of light of the colors whose difference in brightness to be adjusted; and
adjusting the amount of light of the colors to be adjusted based on said color adjustment data.

* * * * *